E. SODERGREN.
ATTACHMENT FOR WOODWORKING MACHINES.
APPLICATION FILED MAY 13, 1908.
915,496.
Patented Mar. 16, 1909.
8 SHEETS—SHEET 1.
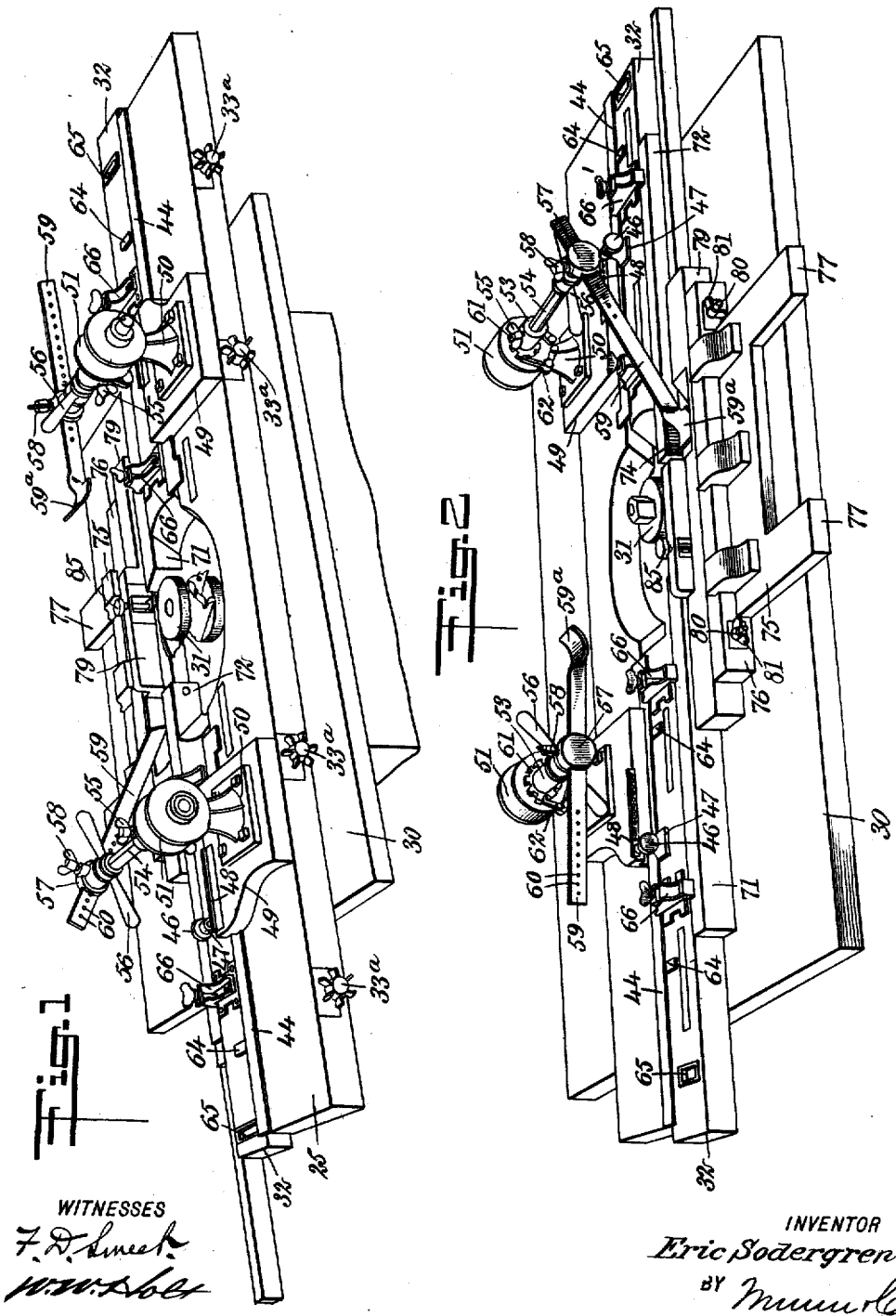
WITNESSES
INVENTOR
Eric Sodergren
BY
ATTORNEYS

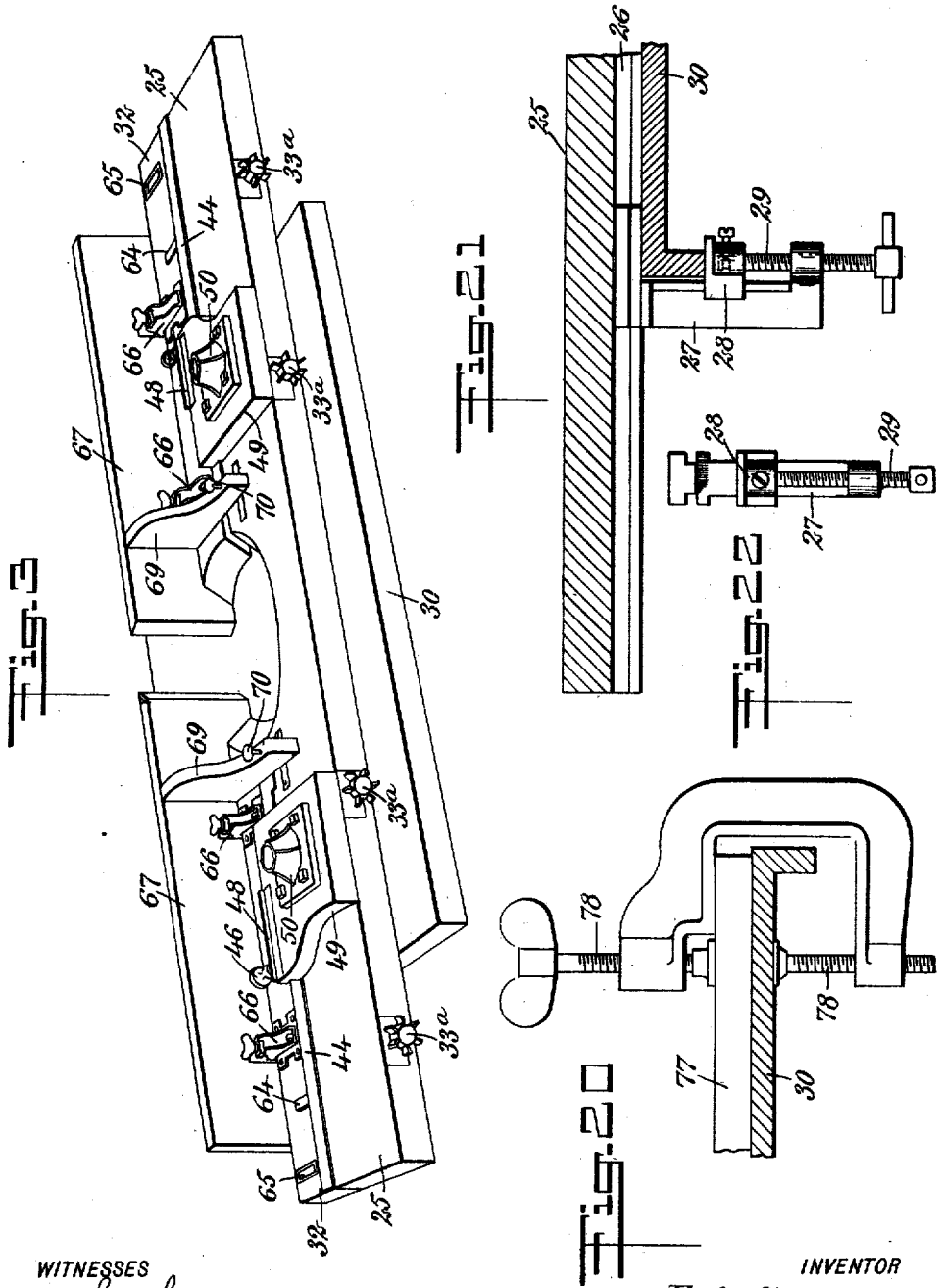

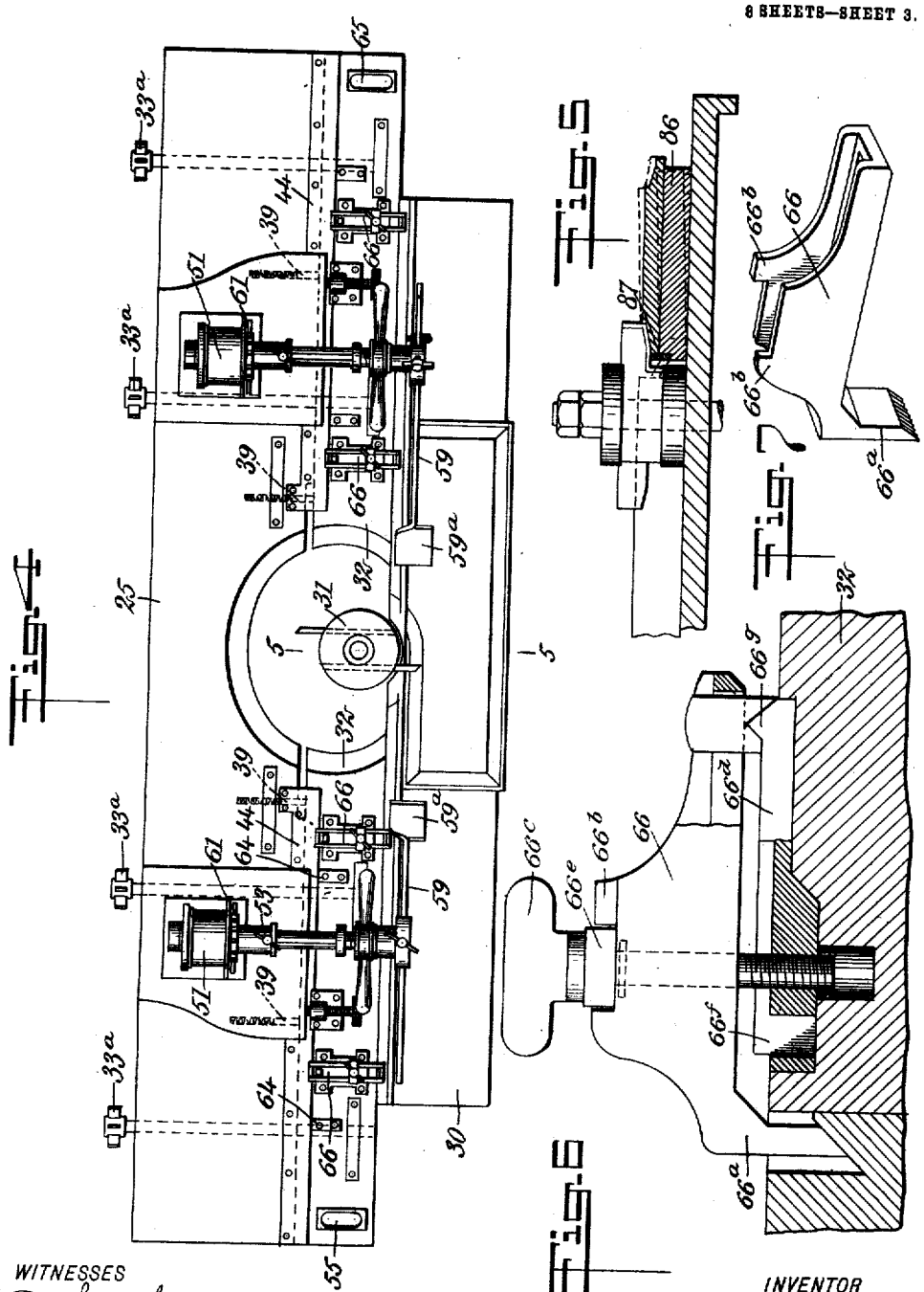

E. SODERGREN.
ATTACHMENT FOR WOODWORKING MACHINES.
APPLICATION FILED MAY 13, 1908.
915,496.
Patented Mar. 16, 1909.
8 SHEETS—SHEET 4.
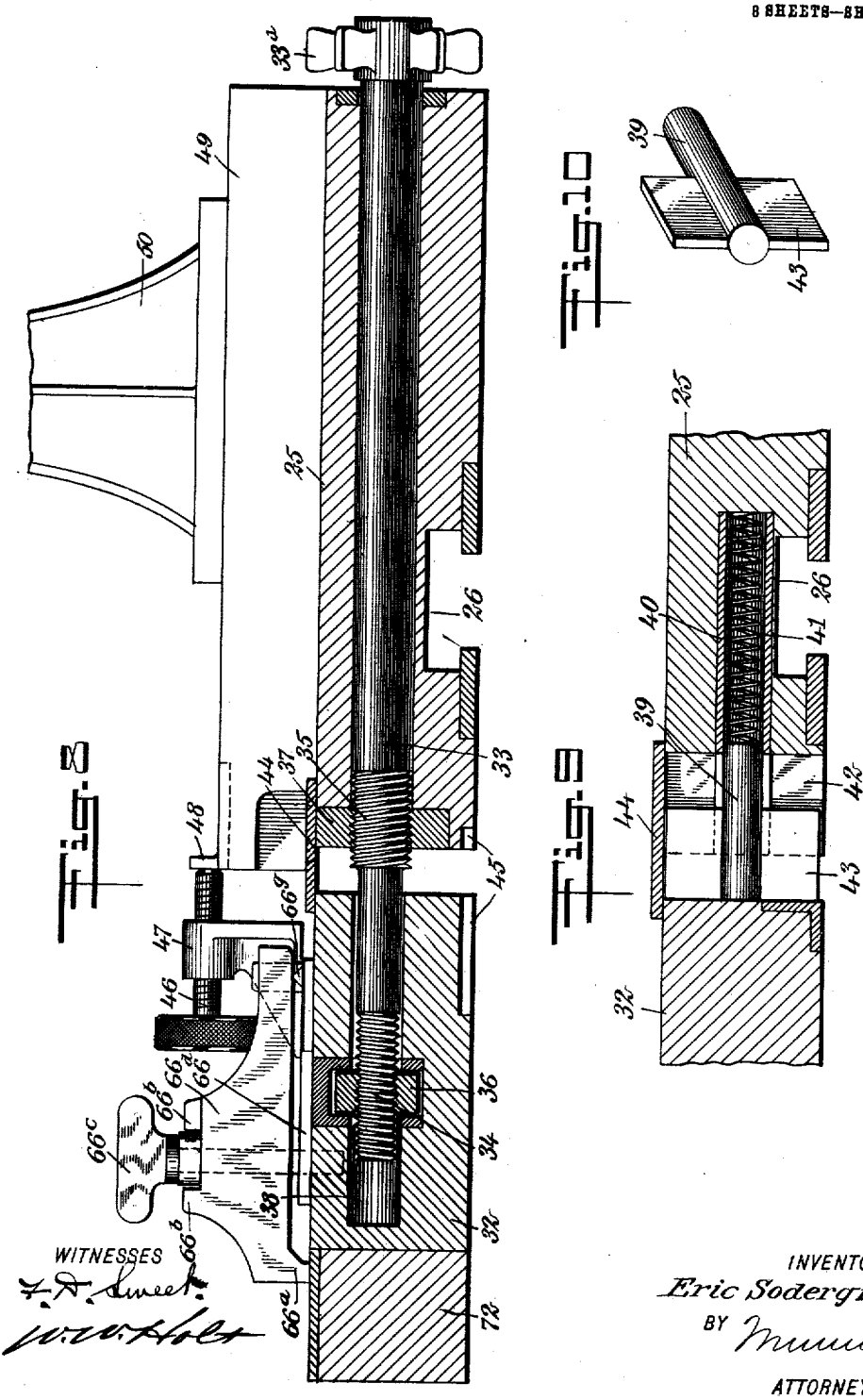
INVENTOR
Eric Sodergren
BY
ATTORNEYS

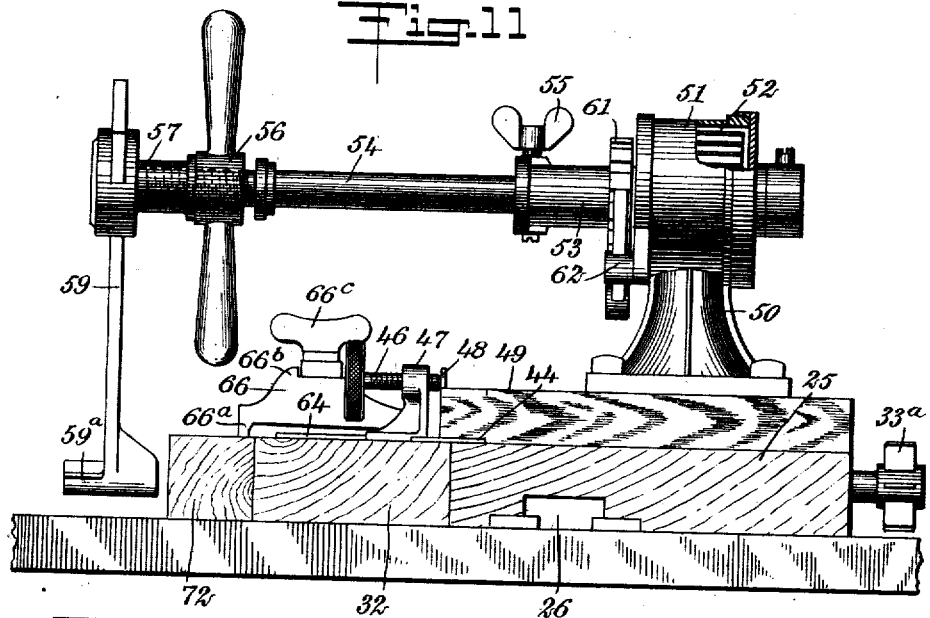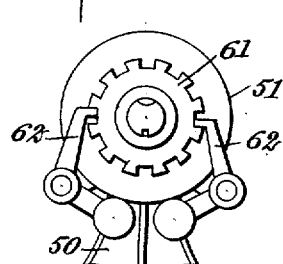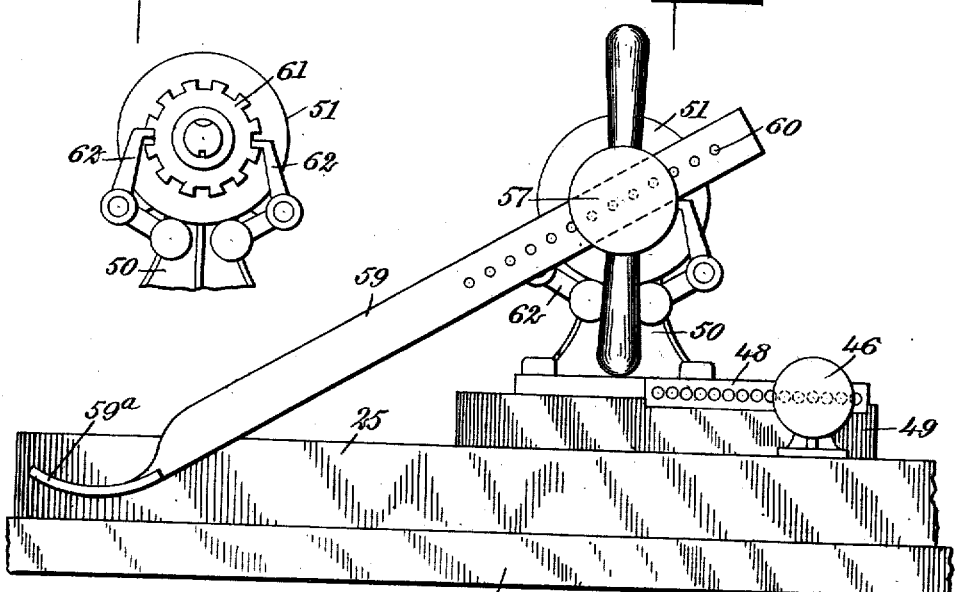

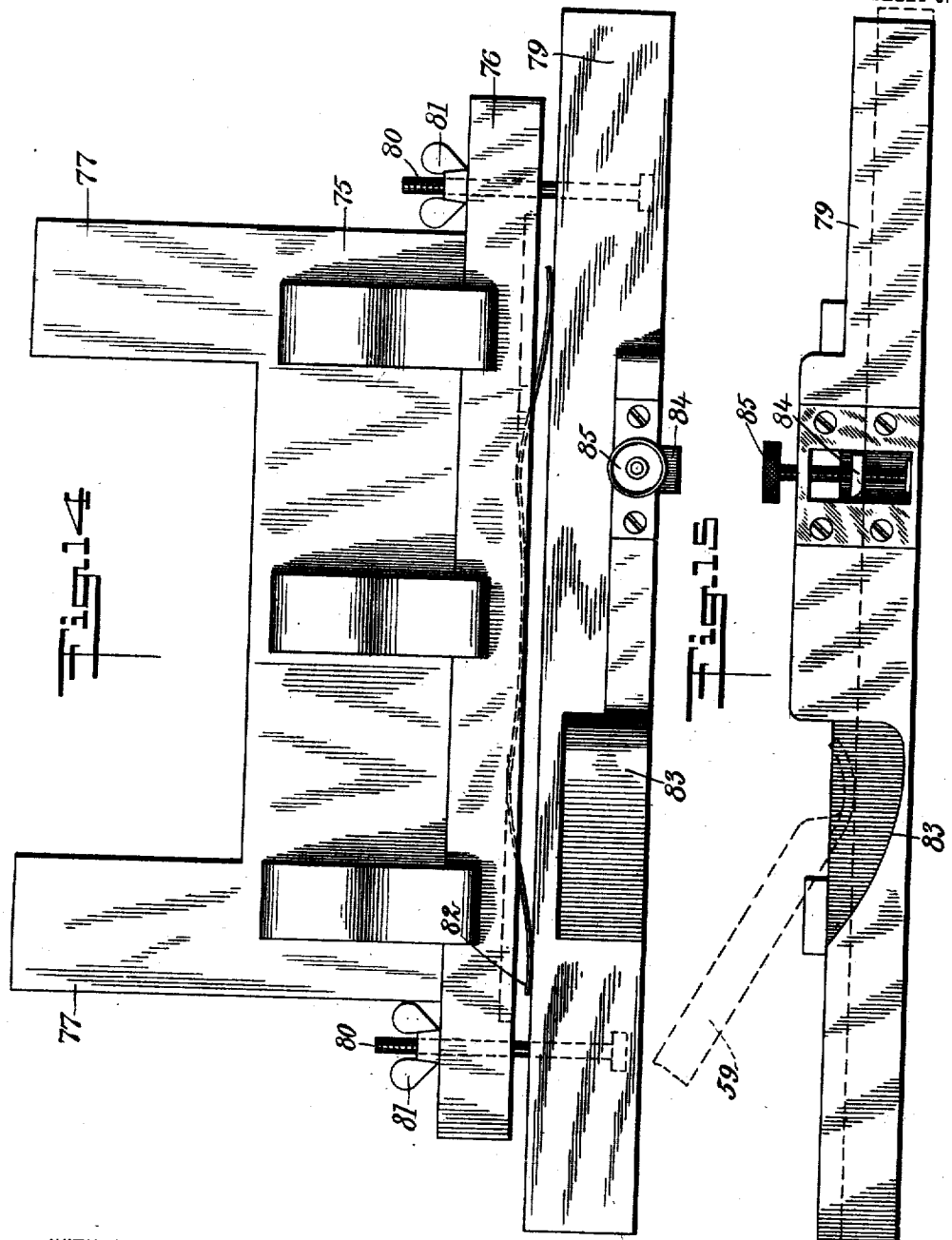

E. SODERGREN.
ATTACHMENT FOR WOODWORKING MACHINES.
APPLICATION FILED MAY 13, 1908.
915,496.
Patented Mar. 16, 1909.
8 SHEETS—SHEET 7.
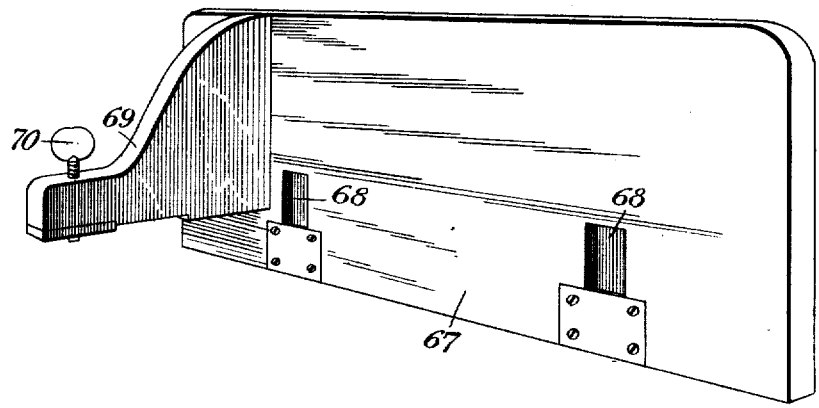
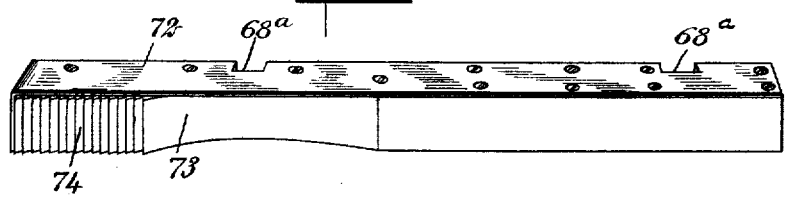
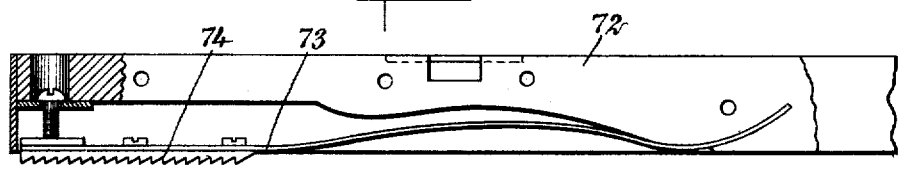
WITNESSES
INVENTOR
Eric Sodergren
BY
ATTORNEYS

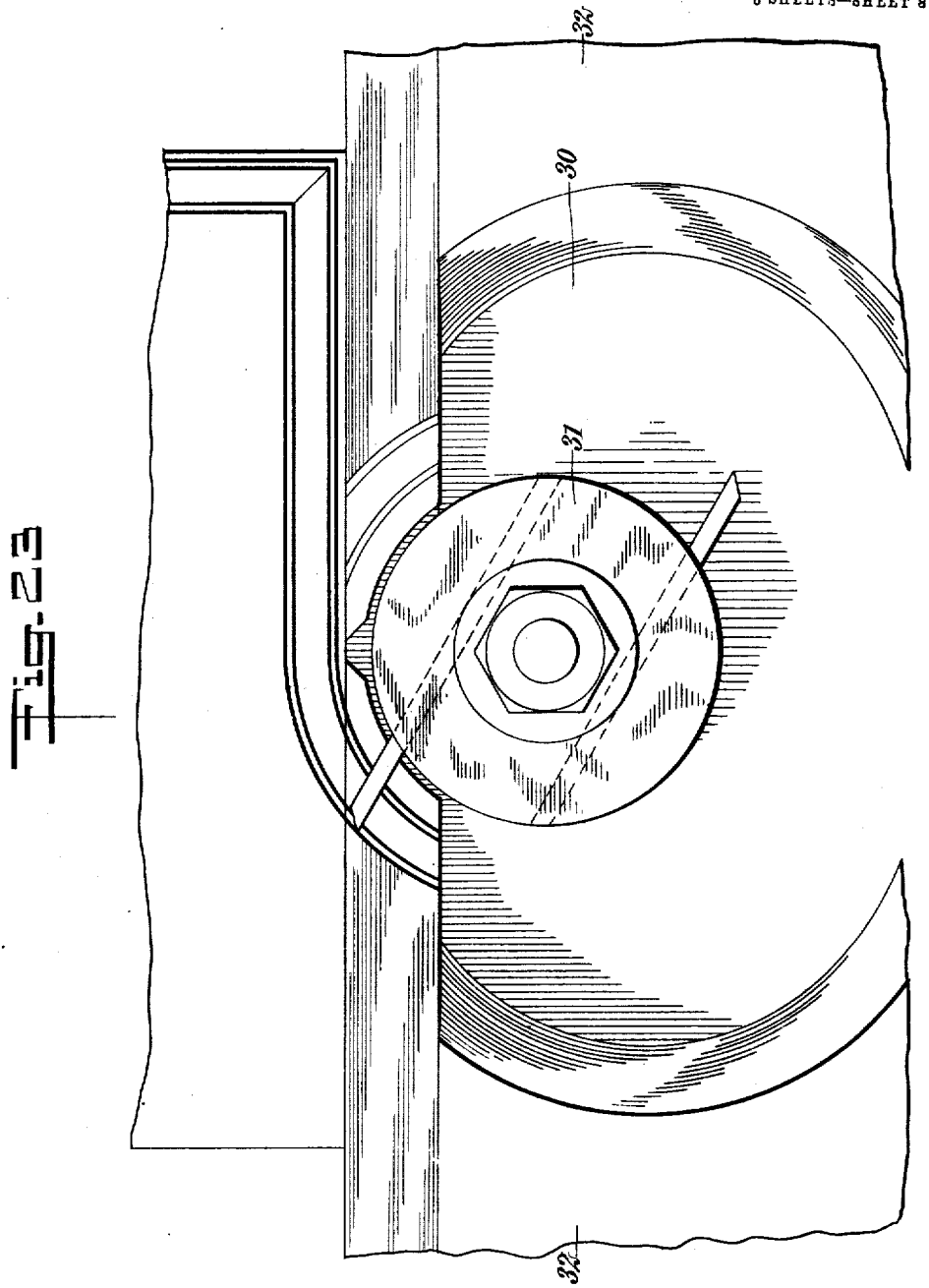

UNITED STATES PATENT OFFICE.

ERIC SODERGREN, OF NEW YORK, N. Y.

ATTACHMENT FOR WOODWORKING-MACHINES.

No. 915,496.  Specification of Letters Patent.  Patented March 16, 1909.

Application filed May 13, 1908. Serial No. 432,601.

*To all whom it may concern:*

Be it known that I, ERIC SODERGREN, a citizen of the United States, and a resident of the city of New York, borough of Manhattan, in the county and State of New York, have invented a new and Improved Attachment for Woodworking-Machines, of which the following is a full, clear, and exact description.
This invention is an improvement in attachments for wood working machines particularly variety molders having a revoluble vertical cutter, and has for its purpose to provide an adjunct to such devices by which moldings, panels, etc. can be cut rapidly and with accuracy without requiring any particular skill on the part of the operator.

In carrying out my invention, I aim to dispense in so far as possible with the use of special gages for particular varieties of work, which gages are usually not to be found if again wanted, and provide in the place of such gages a compact and easily applied attachment having a wide field of usefulness.
By this attachment I am able to rapidly and accurately plane or cut very thin or bent material without the exercise of more than ordinary care.

The invention further resides in certain special features of construction and combination of parts as will be hereinafter particularly described and claimed.

Reference is to be had to the accompanying drawings forming a part of this specification, in which similar characters of reference indicate corresponding parts in all the views.

Figure 1 is a perspective view of my improved attachment applied to a wood working machine; Fig. 2 is a like view, looking from the opposite side; Fig. 3 is a perspective view of the attachment when rigged up to cut relatively wide material; Fig. 4 is a plan of the attachment, with the parts in a position as when used for cutting panels; Fig. 5 is a cross-section on the line 5—5 of Fig. 4; Fig. 6 is a partial cross-section through the attachment adjacent to one of the screw-clamps; Fig. 7 is a perspective view of the body of the clamp shown in Fig. 6; Fig. 8 is a cross-section through the attachment adjacent to one of the screws which forms an adjustable connection between the base-board and one of the leaves; Fig. 9 is a fragmentary sectional view adjacent to one of the spring-pressed pins for normally forcing one of the leaves outwardly from the base-board and taking up the lost motion between the screw-threads; Fig. 10 is a perspective view of the pin shown in Fig. 9; Fig. 11 is an end view of the attachment as applied to the machine;
Fig. 12 is a fragmentary side view of the same, showing one of the spring clamping-arms; Fig. 13 is a face view of the ratchet mechanism for controlling one of the spring-arms; Fig. 14 is a plan of an adjunct of the attachment as ordinarily used in working on very thin material; Fig. 15 is an inside edge view of the same; Fig. 16 is a perspective view of a detachable board used in elevating the edge or working face of one of the leaves of the attachment, as when cutting very wide material, two of such boards being ordinarily employed, as illustrated in Fig. 3; Figs. 17 and 18 are perspective views of blocks which are detachably applied to the working edges of the leaves of the attachment when an adjunct shown in Figs. 14 and 15 is in use; Fig. 19 is a partial longitudinal section through the block shown in Fig. 18, showing the spring-pressed dog; Fig. 20 is a partial section through the machine table adjacent to one of the clamps as used for holding the adjunct shown in Fig. 14; Fig. 21 is a partial longitudinal section through the machine bed and the base-board of the attachment, showing one of the clamps by which the base-board is detachably and adjustably secured; Fig. 22 is an edge view of the clamp shown in Fig. 21; and Fig. 23 is a fragmentary plan of the attachment, on an enlarged scale, when used for cutting paneling.

The attachment embodies in its construction, a base-board 25 having a longitudinal T-shaped slot 26 in its under face for receiving the correspondingly-shaped head of a clamp 27, as shown in detail in Figs. 21 and 22. This clamp is of U-form and has a jaw 28 slidably mounted on its intermediate portion and operated by a screw 29. Two of such clamps are used in adjustably securing the attachment to the table 30 of a wood working machine; such a machine for example as is provided with a revoluble cutter 31 carried on a vertically-arranged spindle and known as a variety molder.

The base-board 25 at one side is provided with two leaves 32 arranged at opposite sides of the transverse center and separated by an opening which receives the cutter 31 and partially extends into the base-board. The base-board and each leaf are adjustably connected together by a pair of transversely-arranged screws 33, each screw being constructed as illustrated in Fig. 8, wherein it will be observed it is provided with a reduced portion at its end having a thread 34 of one hand, and a thread 35 of the opposite hand at the beginning of its enlarged portion, these threads respectively engaging nuts 36 and 37 carried by a leaf 32 and the base-board 25, the nut 36 and that portion of the screw passing into the leaf being received in a horizontal slot 38, which admits of the leaf being adjusted longitudinally, and the nut 37 being rigid with the base-board 25. Each screw 33 has a winged head 33ª by which it is actuated, which head obviously requires very little turning in attaining the proper adjustment of the leaf in view of the double thread on the screw. In addition to the pair of screws between the base-board and each leaf there is also provided at opposite sides of each of the inside screws, a pin 39 slidable in the tubular casing 40, with the spring 41 normally forcing the pin from the casing against the leaf 32. The tubular casing, which, as shown in Fig. 9, is received in an opening formed in the base-board, is, together with said board, vertically slotted as indicated at 42 for receiving a feather 43 passing through the end or head of the pin, as shown in Fig. 10. These feathers prevent the passage of shavings between the base-board and the leaves, and are assisted in this matter by plates 44 which are attached to the base-board and project a suitable distance beyond its edge over the top of the leaves. By keeping out the shavings between the base-board and leaves, no difficulty is experienced in adjusting the latter. Should, however, a few cuttings find their way in the slots or openings between these parts they will not interfere with the moving of the leaves into close contact with the base-board since the adjacent bottom edges of each leaf and board are rabbeted as indicated at 45 in Fig. 8.

It will be observed from Fig. 8 that the nuts 36, in which the extremities of the screws 33 are threaded, loosely fit in metal channels, which admits of one screw of each leaf being threaded inwardly or outwardly more than the other screw to throw the leaf at an angle. When the leaves are adjusted to the required position, each is secured by a set-screw 46, which, as best shown in Figs. 8 and 11, is threaded horizontally through a bracket 47 attached to the leaf, and engages any one of a series of recesses formed in the upright flange of an angle-iron 48, the latter being secured to a block 49, which in turn is rigidly attached to the base-board 25. On each block 49 is mounted a pedestal 50, of a spring clamp, which embodies in its construction a cylindrical casing 51 integral or otherwise rigidly attached to the pedestal, said casing containing a spring 52, one end of which is attached to the casing, and the opposite end to a sleeve 53 journaled in the casing. Slidably splined in the sleeve 53 is a shaft 54 adapted to be secured in any position within certain limits by a set-screw 55. The outer end of the shaft 54 is threaded for receiving a clamping-nut 56 having operating arms, as shown, and also for receiving at the outside of the clamping-nut, a nut 57 having a diametrically slotted head in which is adjustably held by a set-screw 58, a clamping-arm 59. The clamping-arm is constructed with a curved presser-foot 59ª, and is provided in the length of its shank with a number of apertures 60 for receiving a cotter or other like pin, which operates to prevent its accidental slipping into the path of the revoluble cutter.

Attached to the sleeve 53 is a ratchet-wheel 61, normally engaged by a pair of gravity-operated pawls 62 arranged at its opposite sides, as illustrated in Fig. 13. The construction of the engaging ends of these pawls is such that when they are thrown in, the spring 52 will give the shaft 54 a sufficient turn to force the clamping-arms firmly to the work after the nut 56 has been adjusted to lock the nut 57 to the shaft 54 at the proper point, one of the pawls 62 serving to prevent the spring from unwinding when the shaft is free to turn independently of the arm, and the other pawl operating to prevent the shaft from turning against the tension of the spring when the nut 56 is loosened.

Each leaf 32 is provided on its upper face with a pair of spaced stops 64 designed to contact with the edge of the guard plate 44 when the leaf is drawn to the limit of its inward movement at both ends, in which position the outer edges of the leaves are in exact alinement. The upper face of each leaf is further provided with a handle 65 by which it is shifted back and forth, and with spaced clamps 66, these clamps embodying in their construction, as best shown in the detail views of Figs. 6 and 7, a longitudinally slotted body portion having a depending foot at one end provided with a downwardly and outwardly inclined serrated edge; and the side walls of the body portion of the clamp at each side of the slot are of substantial height and each provided with a lug 66ᵇ arranged at diagonally opposite corners. On the top edges of the side walls of the body portion of the clamp, a screw 66ᶜ passes through the slot of the clamp and is threaded into a plate 66ᵈ fixed to the leaf, the screw also passing through a washer 66ᵉ which is adapted to seat on the top edges of the side walls of the body portion of the clamp or be thrown around in alinement therewith and pass into the slot, which admits of the displacement of the clamp without turning the screw any considerable extent. The plate 66ᵈ has a recess 66ᶠ at its front end for receiving the foot 66ª when the clamp is not in use, and is provided at its opposite and inner end with a knife-edge projection 66g for engaging the rear end of the clamp body and preventing the same from slipping when the clamp is moved.

The clamps are used for holding several accessories or adjuncts to the attachment, such, for example, as illustrated in detail in Figs. 3, 16, 17, 18 and 19, the same being employed when special material is to be planed or cut, that shown in Figs. 3 and 16 comprising relatively wide abutment boards 67, each board having pockets 68 in its inner face for receiving the feet of the clamps, the bottom edges of these recesses being inclined to correspond to the inclination of said feet, whereby when the clamps are tightened they will tend to draw the board firmly against the outer edge of the leaf. Each board has a bracket 69 extending inwardly from its inner face, which is provided with a set-screw 70 designed to contact with the top of the base-board when the abutment is in place, and operate to move the abutment board to and from an exact vertical position. These abutment boards are used in connection with the principal part of the attachment when working on relatively wide material. When cutting very thin molding or performing a like operation, guide-blocks 71 and 72 respectively, shown in Figs. 17 and 18, are secured to the edges of the leaves by the clamps. These guide-blocks have pockets 68ª corresponding to the pockets 68, and the guide-block 72 which is placed in connection with the leaf from which the work is fed, is constructed on its outer edge with a spring-pressed dog 73, the same being provided with teeth 74 on its outer face inclining in a direction to engage the material and prevent it from being thrown back by the cutter. When the blocks 71 and 72 are in use, the device illustrated in detail in Figs. 14 and 15 is also employed. This device comprises a bed-plate 75 having a bar 76 at its inner side and arms 77 extending outwardly from its opposite side which are designed to be clamped to the machine table, for which purpose I make use of such U-shaped clamps as shown in Fig. 20, these clamps having opposed screws 78 which respectively engage the under face of the machine table and the top of the arms. The bar 76 is connected to a clamping bar 79 by screws or bolts 80, the latter having thumb-nuts 81 by which the distance between the two bars is regulated, the bars being normally forced apart by a spring 82 interposed between them, which, when this particular device is in place, forces the clamping-bar firmly against the material to be cut, as illustrated in Figs. 1 and 2. The clamping-bar 79 is provided with a recess 83 for receiving the curved foot 59ª of the clamping arm 59 in order that the arm can be used to hold down relatively thin material to the machine table in advance of the cutter. For likewise clamping such material at the opposite side of the cutter the bar 79 has a vertical movable clamp 84 actuated by the screw 85, the jaw of the clamp projecting slightly beyond the edge of the bar to engage with the material.

With the attachment thus constructed and arranged I have found in practice that I am enabled to accurately cut the thinnest molding or perform other like operations without the exercise of more than ordinary care. In cutting paneling with the attachment I use a board 86, as shown in Fig. 5, which has a semi-dove-tail at its inner edge for receiving a strip 87, the latter being cut out slightly adjacent to the cutter in order that the work may be brought close to the latter, and is further provided with pockets in which the clamps 66 are adapted to engage. Should the beveling on the paneling be cut at a greater or less inclination than desired, the board 86 may be tilted by placing a strip under its inner or outer edge in order that it may be laterally inclined when clamped, as shown in dotted outline. The clamps 66 are not only adapted to secure the devices herein enumerated and illustrated, but may be used for retaining any form of gage or appliance used to properly direct or support the material. The clamping-arms 59 will ordinarily be in use at all times when the molding or other material to be cut is manually held directly against the edges of the adjustable leaves. These leaves when used without supplementary devices and at times with them, will be moved in as close proximity to the cutter as possible in order that the work may have no length except the point which the cutter acts, which is un-supported. By adjusting the leaves out of true parallelism, material which is naturally curved may be uniformly cut without exercising any undue lateral pressure in forcing the material to the cutter. The independent adjustment of the leaves also admits of the supporting of the work at both sides of the cutter irrespective of the amount of material which is removed by the cutting operation.

While I have shown and described the preferred construction and arrangement of the several features of the attachment, I nevertheless recognize that modifications of the same may be made without departing from the nature of the invention as defined in the claims annexed.

Having thus described my invention, I claim as new and desire to secure by Letters Patent:

1. The combination of a base-board adapted to be secured to the table of a wood working machine, leaves adjustably connected to the board at one side thereof for guiding the work to and from the cutter of the machine, guard-plates overlapping the edges of the leaves and the adjacent edge of the board, and spring-pressed pins arranged between the board and leaves, having approximately vertically-arranged feathers underneath the guard-plate.

2. The combination of a wood working machine having a cutter, means laterally and longitudinally adjustable on the table of the machine at opposite sides of the cutter, guide members having pockets, and clamps having feet adapted to project into the pockets of the members and secure them to the edges of said means.

3. The combination of a base-board adapted to be secured to the table of a wood working machine, leaves arranged at one side of the base-board for guiding the work to and from the cutter of the machine, screws for laterally adjusting the leaves relatively to the base-board, and on which the leaves are lengthwise movable and means for locking the leaves and the base-board together in adjusted position.

4. The combination of a base-board adapted to be secured to the table of a wood working machine, leaves arranged at one side of the base-board for guiding the work to and from the cutter, having approximately horizontal slots longitudinally arranged, nuts fixed to the base-board, nuts slidably mounted in the slots of the leaves, and screws each having a thread of one hand in engagement with the fixed nuts, and a thread of another hand in engagement with the slidable nuts.

5. The combination of a base-board adapted to be secured to the table of a wood working machine, leaves adjustably connected with the base-board at one side thereof, clamps carried by the leaves, having depending feet provided with outwardly and downwardly inclined bottom edges, and supplementary devices adapted to be engaged by the feet of said clamps and forced to the machine table in contact with the leaves.

6. The combination of a base-board adapted to be secured to the table of a wood working machine, leaves adjustably connected to the base-board at one side thereof, longitudinally slotted clamps carried by the leaves, movable to the inside of and also beyond the margin thereof and having depending feet, and supplementary devices adapted to be engaged by the clamps and forced to the machine table and to the leaves.

7. The combination of a wood working machine, a base board, leaves longitudinally and laterally adjustable on the table of the machine to and from the cutter thereof and operatively connected with the base board, guide-blocks adapted to be secured to the edges of said leaves, and a spring-pressed dog carried by one of the guide-blocks for engaging the work as it is passed to the cutter.

8. The combination of a device adapted to be detachably secured to the table of a wood working machine, means in connection with said device for guiding the work to the cutter of the machine, a shaft, a clamping-arm connected transversely of said shaft, and means independent of the clamping arm tending to revolve the shaft in a direction to force the arm to the machine table adjacent to the first mentioned means.

9. The combination of a device adapted to be secured to the table of a wood working machine, having means in connection therewith for guiding the work to the cutter of said machine, and an arm longitudinally and laterally adjustable, and means independent of the arm tending to force it to the machine table.

10. The combination of a base-board adapted to be secured to the table of a wood working machine, a member in connection with the base-board for guiding the work to and from the cutter of the machine, a casing carried by the base-board having a sleeve journaled therein, a shaft slidably splined in the sleeve, a spring in the casing normally tending to turn the sleeve in one direction, and an arm carried by the shaft for clamping the work to the machine table adjacent to said member.

11. The combination of a base-board adapted to be secured to the table of a wood working machine and having a member in connection therewith for guiding the work to the cutter of the machine, a longitudinally adjustable shaft carried by the base-board, means normally tending to turn the shaft in one direction, a nut threaded on one end of the shaft, a nut for locking the first mentioned nut to the shaft, and an arm in connection with the first mentioned nut for clamping the work to the table adjacent to said member.

12. The combination of a base-board having means for detachably and adjustably securing it to the table of a wood working machine, longitudinally adjustable leaves arranged at one side of the base-board having means in connection therewith for adjusting them laterally with respect to the base-board, a spring-pressed arm longitudinally and laterally adjustable for clamping the work to the machine table adjacent to each leaf, and means for holding the arm above the work against the tension of its spring.

13. The combination of a wood working machine having a table and a cutter, a casing, a sleeve journaled in the casing, a ratchet-wheel fixed to the sleeve, a shaft splined in the sleeve, a pawl normally engaged with the ratchet-wheel, an arm carried by the shaft transversely thereof, and means tending to revolve the shaft in a direction to force the arm to the table, whereby it is adapted to serve as a clamp for engaging the work as it is fed to the cutter.

14. The combination of a wood working machine having a cutter, a shaft slidably mounted, means tending to revolve the shaft in one direction, and an arm for forcing the work to the machine table as it is fed to the cutter, carried by said shaft and adjustable transversely thereof.

15. The combination of a wood working machine, a casing carried on the table of the machine, a sleeve journaled in the casing having a ratchet-wheel fixed thereto, means within the casing normally tending to turn the sleeve in one direction, a shaft splined in said sleeve, a nut threaded on one end of the shaft and having a clamping-arm, a second nut for locking the first mentioned nut to the shaft, a pawl in engagement with the ratchet-wheel for limiting the revolution of the shaft when loosening the second nut, and a pawl in engagement with the ratchet-wheel for limiting the revolution of the shaft in the opposite direction by the action of said means.

16. The combination of a wood working machine, an arm for clamping the work to the table of the machine, a shaft, a nut by which the clamping-arm is carried, threaded on the shaft, a nut for locking the first mentioned nut to the shaft, means normally tending to revolve the shaft in a direction to force the arm to the table, and means for limiting the revolution of the shaft in the opposite direction when loosening the said second nut.

17. The combination of a wood working machine, an arm for securing the work to the table of the machine, a shaft by which the arm is carried, a spring normally tending to revolve the shaft in one direction, and means independent of the arm for varying the tension on the spring.

18. The combination of a base board having means for detachably and adjustably securing it to the table of a wood working machine, leaves in connection with the base-board laterally and longitudinally adjustable with respect thereto, guide-blocks adapted to be detachably secured to the edges of the leaves, a spring-pressed dog arranged in the guide-blocks for engaging edge of one of the guide-blocks for engaging the work as it passes to the cutter, and spring-pressed arms carried by the base-board for clamping the work to the machine table adjacent to the guide-blocks.

19. An attachment for wood working machines comprising a bed-plate adapted to be detachably secured to the machine table, a bar, springs arranged between the bed-plate and bar to move it laterally to the work, bolts carried by the bar and extending from the bed-plate for moving the bar inwardly against the tension of the spring, a clamping member projecting beyond the working edge of said bar to force the work to the machine table, and a screw for vertically adjusting the plate.

20. The combination of a baseboard adapted to be detachably secured to the table of a wood working machine, leaves arranged at one side of said board for guiding the work to and from the cutter of the machine, and screws passing through the baseboard and extending into the leaves for adjusting the leaves laterally, and on which the leaves are lengthwise slidable.

21. The combination of a baseboard adapted to be detachably secured to the table of a wood working machine, leaves arranged at one side of said board for guiding the work to and from the cutter of the machine, screws passing through the baseboard and extending into the leaves for adjusting the leaves laterally, and on which the leaves are lengthwise slidable, and means independent of said screws for locking the leaves against endwise movement.

22. The combination of a baseboard adapted to be detachably secured to the table of a wood working machine, of leaves arranged at one side of said board for guiding the work to and from the cutter of the machine and adjustable longitudinally with respect to the board, and means passing transversely through the board and extending into the leaves for adjusting the leaves laterally to and from the board.

23. The combination of a baseboard adapted to be detachably secured to the table of a wood working machine, of leaves arranged at one side of said board for guiding the work to and from the cutter of the machine, with the upper faces of the leaves lying in the same horizontal plane with the upper face of the board, and screws extending crosswise through the board and having a threaded connection with the leaves.

24. The combination of a baseboard adapted to be detachably secured to the table of a wood working machine, leaves laterally and longitudinally adjustable at one side of the board, pedestals rigidly attached to the board, having casings at the upper ends thereof, shafts lengthwise adjustable in said casings, springs within the casings tending to revolve the shafts in opposite directions, and arms for clamping the work to the machine table adjacent to said leaves and arranged in opposed position.

25. The combination of a base-board adapted to be detachably secured to the table of a wood-working machine, leaves arranged at one side of the base-board, nuts arranged longitudinally in the leaves, and slidable longitudinally through the base-board having a threaded engagement therewith of one hand and a threaded engagement in said nuts of the opposite hand.

26. The combination of a base-board adapted to be detachably secured to the table of a wood-working machine, leaves laterally and longitudinally adjustable at one side of the board, and clamps carried by the leaves having feet overhanging the edges thereof, with the bottoms of the feet inclining downwardly and outwardly.

In testimony whereof I have signed my name to this specification in the presence of two subscribing witnesses.

ERIC SODERGREN.

Witnesses:
W. W. HOLT,
JOHN P. DAVIS.